Oct. 15, 1929.  R. B. JACKSON  1,731,666
AIRPLANE
Filed Jan. 30, 1928  2 Sheets-Sheet 1

INVENTOR
RAYMOND B. JACKSON
ATTORNEY

Oct. 15, 1929.  R. B. JACKSON  1,731,666
AIRPLANE
Filed Jan. 30, 1928    2 Sheets-Sheet 2

INVENTOR
RAYMOND B. JACKSON
By Fad Adams
ATTORNEY

Patented Oct. 15, 1929

1,731,666

UNITED STATES PATENT OFFICE

RAYMOND B. JACKSON, OF LOS ANGELES, CALIFORNIA

AIRPLANE

Application filed January 30, 1928. Serial No. 250,655.

My invention relates to airplanes, and more particularly to a novel wing structure for use on an airplane.

Present day airplanes are open to the disadvantage that they are difficult to control, and, in adverse conditions become uncontrollable when in a side slip or a tail spin, which usually results in a crash. I have invented an airplane having an inherent stability and which may be brought back to an even keel, even though in a side slip or in a tail spin.

It is an object of my invention to provide an airplane wing which has an inherent stability.

A further object of my invention is to provide an airplane of novel design which may be immediately recovered from side slips or tail spins.

It is a further object of my invention to provide an airplane having a long gliding angle, low landing speed, and which will handle easily even in rough air.

Still a further object of my invention is to provide an airplane which cannot be nosed upward or downward into a vertical position.

I accomplish these desirable results by utilizing a wing which extends over practically the entire length of the fuselage. On the outer corners of this wing are hinged certain control wings and ailerons, these wings and ailerons being pivoted to the main wing on lines which are non-perpendicular to the fuselage axis.

It is an object of my invention to provide an airplane wing having pivoted wings at the outer corners thereof, these wings being pivoted on lines non-perpendicular to the axis of the fuselage.

Further objects and advantages of my invention will be made evident hereinafter.

Referring to the drawings in which I illustrate one embodiment of my invention,—

Figure 1:
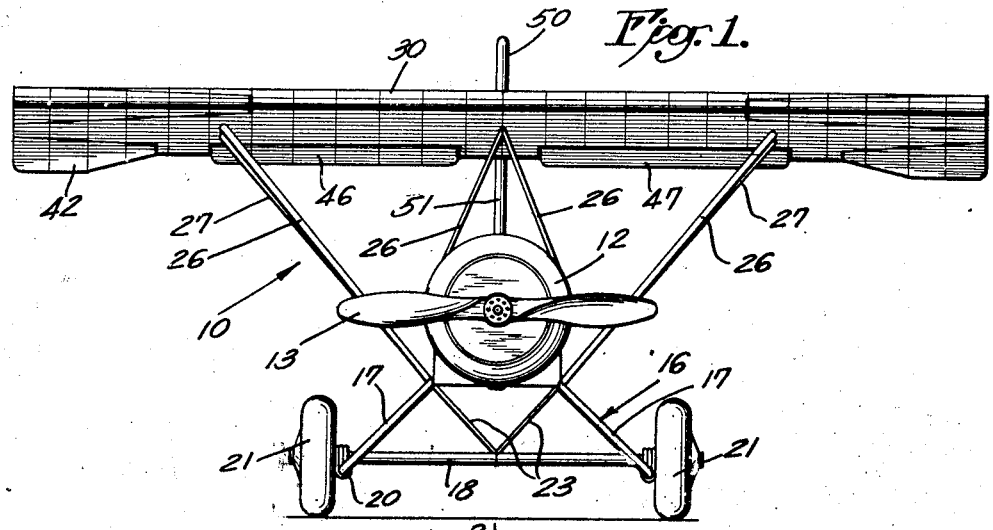
Fig. 1 is a front view of an airplane embodying the features of my invention.

Referring particularly to these drawings, an airplane 10 of my invention has a fuselage 11 of somewhat conventional design. The forward end of the fuselage mounts a motor 12 adapted to operate a propeller 13 which draws the airplane forward. Secured to the lower portion of the fuselage is a landing gear 16 which may be of conventional design. The particular type of gear illustrated in the drawings comprises struts 17 extending downward and outward from the fuselage, these struts being secured to an axle 18 by means of suitable shock absorbers 20. Wheels 21 are secured to the outer ends of the axle and are adapted to carry the airplane over the ground when the plane is rolling thereover. Suitable V braces 23 add rigidity to the landing gear 16.

Figure 2:
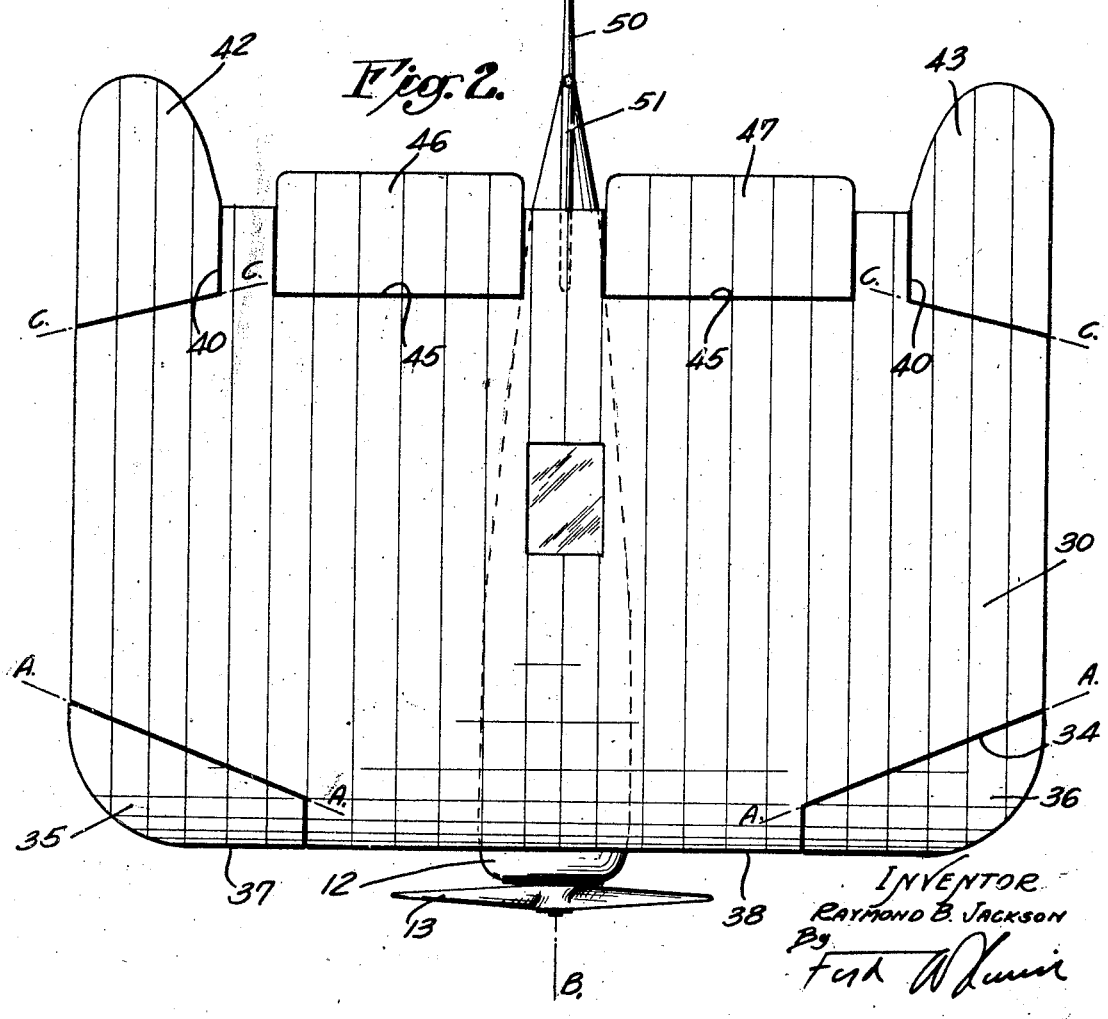
Fig. 2 is a top view of the airplane.
Figure 3:
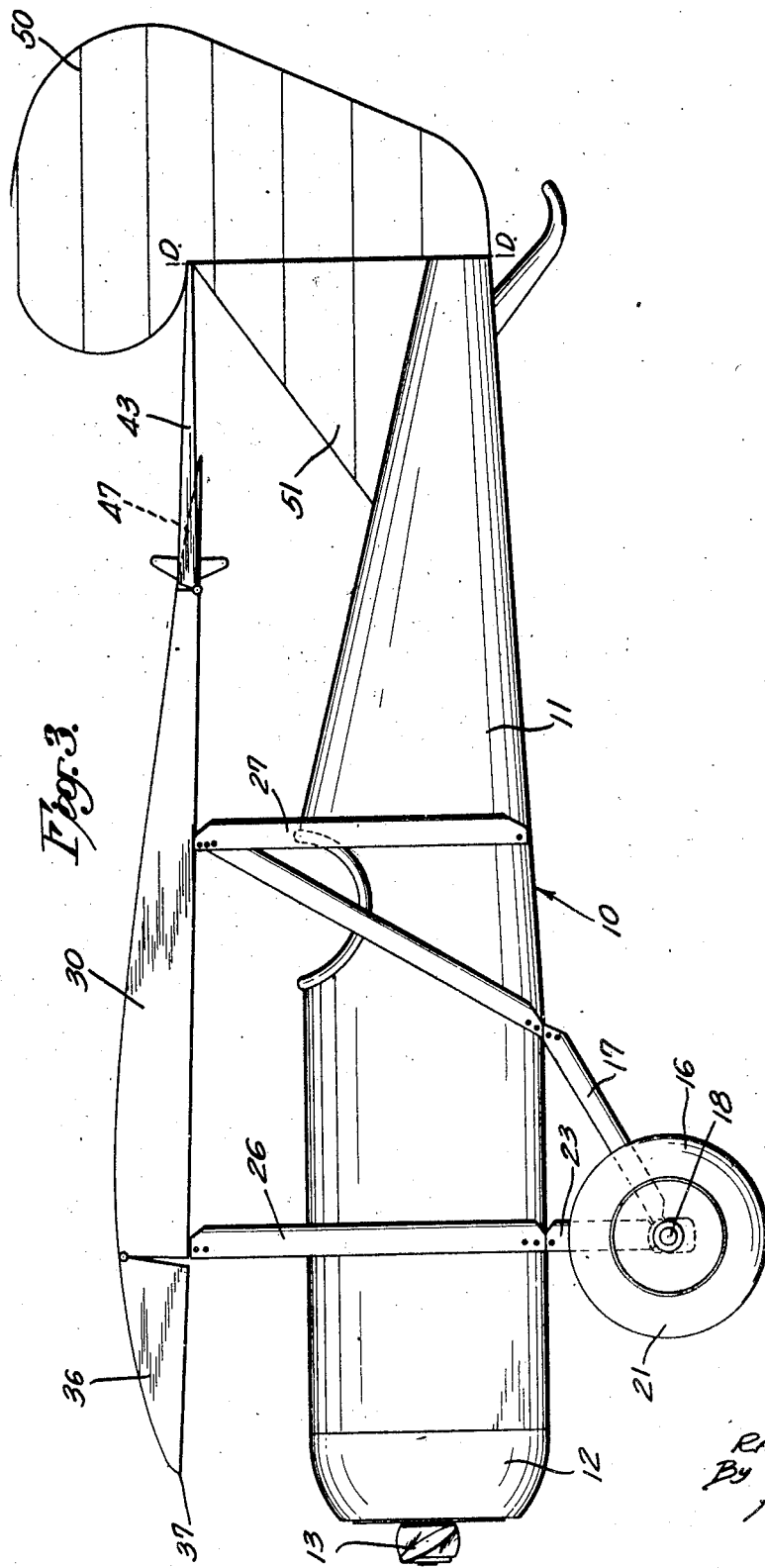
Fig. 3 is a side elevational view of the airplane.

Supported above the fuselage 11 by means of forward and rear struts 26 and 27 suitably braced to the fuselage is a plane or wing 30 of my invention. As best shown in Figs. 2 and 3, this plane has a much longer chord than does the ordinary airplane wing; in fact, the length of the wing 30 is practically the same as the length of the fuselage 11. This relatively long wing permits a decrease in the span of the wing. The ratio of the span of a wing to the chord thereof is ordinarily defined as the aspect ratio, and I prefer to so form the wing that the aspect ratio thereof approaches unity, although it is within the scope of my invention to use a wing of higher aspect ratio. The use of such a long wing having a relatively low aspect ratio gives a stability to the plane which cannot be otherwise realized.

The plane 30 may be conventionally designed by means of well-known aeronautical formula and the particular camber thereof is not a part of this invention. It is perferable, however, to make the angle between the chord of the wing and the direction of flight small, this angle commonly being termed the angle of attack. It is desirable to make as large as possible the ratio of the lift developed by a wing relative to the drag or retarding force present in moving the wing through the air. This ratio, commonly called the L/D ratio may be much larger in a wing such as that shown in the drawings than is possible with a wing of conventional construction. This is due to the relatively thin wing which can be used and also to the well-known fact that the wing drift is less with a long-chord wing than with a short-chord wing.

Pivoted on axes A—A, as best indicated in Fig. 2, in openings 34 of the plane 30 are control wings 35 and 36. These wings are shaped so as to conform with the outline of the plane 30 and leading edges 37 of the control wings lie substantially adjacent the leading edge 38 of the main wing 30. As best shown in Fig. 2, the axes A—A are not perpendicular to the longitudinal axis of the fuselage, these axes lying along the top of the plane 30 in a direction so as to intersect an axis B—B of the wing 30 at an acute angle.

Pivoted in openings 40 in the outer rear corners of the plane 30 are ailerons 42 and 43, these ailerons being pivoted to the main wing along the axes C—C, these axes being symmetrical with each other and being non-perpendicular to the axis of the fuselage. So, also, the axes C—C are non-parallel to the axes A—A, these pairs of axes converging toward each other as the distance from the fuselage is increased.

Hinged in openings 45 of the wing 30 and on either side of the fuselage 11 are elevators 46 and 47 of any conventional design, these elevators being pivoted to the plane 30 on an axis extending at right angles to the axis of the fuselage.

It is also desirable to attach a suitable rudder 50 to the end of the fuselage, this rudder being pivoted on an axis D—D. A suitable fin 51 joins the upper portion of the fuselage to the rudder 50 and forms a convenient means of hinging the rudder on the axis D—D.

The control wings 35 and 36, and the ailerons 42 and 43 are adapted to be controlled either separately or collectively by suitable means in the cockpit of the fuselage so that these wings and ailerons may be pivoted about their respective axes. This control mechanism is not a part of this invention and is therefore not shown in detail. The rudder 50 and the elevators 46 and 47 are also controlled by suitable control in the cockpit.

When in flight, the operation of my invention is as follows:

The airplane 10 may be caused to climb either by raising the control wings 35 and 36 or by tilting the elevators 46 and 47 upward. A similar action may be obtained by simultaneously pivoting the ailerons 42 and 43 in an upward direction. Ordinarily, however, I prefer to use the elevators 46 and 47 for the purpose of changing the angle of flight of the plane, though it should be understood that the control wings and ailerons may be used for this purpose by being operated either individually or collectively.

Should the airplane go into a side slip, the control wing on the low wing is raised and the aileron on the low wing is lowered. In this instance, the particular control wing and aileron which are thus moved act as elevators to bring the plane back to an even keel. This is due to the fact that when going into a side slip the forward end of the fuselage is usually lower than the tail. The stream of deflected air from the low control wing which has been raised joins the main air stream under the wing, the resultant stream acting upon the lower surface of the lowered aileron to bring the plane back to an even keel. In a tail spin, the ailerons 42 and 43 are simultaneously raised so as to act as elevators to bring the plane back to an even keel. The control wings 35 and 36 may be used for a similar purpose when the airplane is nosed down, although I prefer to use the elevators 46 and 47 for the purpose of bringing the airplane back to an even keel. While the rudder 50 is adapted to normally steer the plane, it is possible by suitable manipulation of the control wings and the ailerons to guide the plane by these means. By drawing both ailerons 42 and 43 and both control wings 35 and 36 into an upward inclined position, these four surfaces additively stabilize the airplane. The elementary principle thus involved may be most clearly understood by bending the corners of a piece of square cardboard upward at an acute angle with the plane. If such a cardboard be dropped, it will drop parallel to the ground rather than sliding through the air with one edge downward as would be the case if the corners were not bent upward.

The essential part of my invention lies in the particular arrangement of the control wings and the ailerons relative to the main wing 30 and it is entirely possible to operate the airplane 10 without using the elevators 46 and 47.

The airplane of my invention is very compact, the wing span usually being in the neighborhood of twenty-five feet for small planes adapted to carry one or two passengers.

Furthermore, the airplane of my invention is very stable when in operation, and has a low landing speed, these features making it a very desirable plane for average civilian use. Its long gliding angle, and its ability to go into a glide automatically when the motor is throttled, are other very desirable features in such a light plane installation. The airplane of my invention will also fly on an even keel when the pilot's hands are removed from the controls.

I claim as my invention:

1. In an airplane, the combination of: a fuselage; a plane secured to said fuselage; control wings pivoted to the front of said plane on lines non-perpendicular to said fuselage; ailerons pivoted to the rear of said plane on lines non-perpendicular to said fuselage; means for controlling said control wings and said ailerons; a rudder on said fuselage; and elevators pivoted to said wing on a line perpendicular to said fuselage.

2. In an airplane, the combination of: a fuselage; a plane secured to said fuselage; control wings pivoted to the front of said plane on lines non-perpendicular to said fuselage, said control wings having leading edges which do not extend forward of said plane; ailerons pivoted to the rear of said plane on lines non-perpendicular to said fuselage, said ailerons extending rearward beyond the trailing edge of said plane; and means for controlling said control wings and said ailerons.

In testimony whereof, I have hereunto set my hand at Los Angeles, California, this 12th day of January, 1928.

RAYMOND B. JACKSON.